(12) United States Patent
Oka et al.

(10) Patent No.: US 7,656,400 B2
(45) Date of Patent: Feb. 2, 2010

(54) IMAGE DATA EDITING DEVICE AND METHOD, AND IMAGE DATA DISPLAY AND METHOD

(75) Inventors: Kiyohiro Oka, Kanagawa (JP); Kunihiko Noguchi, Saitama (JP)

(73) Assignee: Sony Corporation (JP)

( * ) Notice: Subject to any disclaimer, the term of this patent is extended or adjusted under 35 U.S.C. 154(b) by 1405 days.

(21) Appl. No.: 10/333,702

(22) PCT Filed: Jun. 7, 2002

(86) PCT No.: PCT/JP02/05684

§ 371 (c)(1),
(2), (4) Date: May 19, 2003

(87) PCT Pub. No.: WO02/101589

PCT Pub. Date: Dec. 19, 2002

(65) Prior Publication Data

US 2003/0174127 A1    Sep. 18, 2003

(51) Int. Cl.
*G06F 3/00* (2006.01)
(52) U.S. Cl. .................... 345/418; 715/730; 715/731; 715/732
(58) Field of Classification Search ......... 715/730–732, 715/202
See application file for complete search history.

(56) References Cited

U.S. PATENT DOCUMENTS

| | | | | |
|---|---|---|---|---|
| 5,708,826 A | * | 1/1998 | Ikeda et al. ............... | 715/209 |
| 5,983,229 A | * | 11/1999 | Houchin et al. ............. | 707/100 |
| 6,028,603 A | * | 2/2000 | Wang et al. ................. | 715/776 |
| 6,195,093 B1 | * | 2/2001 | Nelson et al. ............... | 715/732 |
| 6,509,909 B1 | * | 1/2003 | Nelson et al. ............... | 715/732 |
| 6,515,762 B2 | * | 2/2003 | Noguchi ..................... | 358/1.9 |
| 2002/0048032 A1 | * | 4/2002 | Ichikawa et al. ........... | 358/1.11 |
| 2002/0180803 A1 | * | 12/2002 | Kaplan et al. ............... | 345/810 |

FOREIGN PATENT DOCUMENTS

| | | |
|---|---|---|
| JP | 2-206873 | 8/1990 |
| JP | 5-120398 | 5/1993 |
| JP | 5-216936 | 8/1993 |
| JP | 6-266347 | 9/1994 |
| JP | 8-315168 | 11/1996 |
| JP | 11-39290 | 2/1999 |

OTHER PUBLICATIONS

Japan Electronic Industry Development Association Standard, Design rule for Camera File Systems, Dec. 1998, V.1, pp. 1-47.*

* cited by examiner

*Primary Examiner*—M Good Johnson
(74) *Attorney, Agent, or Firm*—Lerner, David, Littenberg, Krumholz & Mentlik, LLP

(57) ABSTRACT

A method and a device for converting data of a first format discriminated by an identifier into picture data of a second format different from the first format. In converting the data of the first format into the picture data of the second format different from the first format, discrimination picture data for discriminating the picture data is generated, while data relevant for correlating the picture data to the discriminated picture data is also generated. If, in displaying the converted picture data, the discrimination picture data is selected, the picture data correlated to the discriminated picture data is displayed based on the data relevant for correlating the picture data to the discriminated picture data.

24 Claims, 16 Drawing Sheets

IMAGE DATA EDITING DEVICE AND METHOD, AND IMAGE DATA DISPLAY AND METHOD

TECHNICAL FIELD

This invention relates to editing methods and apparatus for converting data formulated by an application program for presentation into picture data, a recording medium having recorded an editing program used for the editing methods and apparatus, methods and apparatus for displaying picture data converted by the editing methods and apparatus, and to a recording medium having recorded a display program for demonstrating the picture data.

BACKGROUND ART

An application program for formulating a reference material used for presentation, and for displaying the so formulated reference material on the occasion of presentation, is usually employed under a condition in which it is installed on a personal computer. The application program for presentation has the function of saving each page, that is a slide, used for presentation, in one file. In carrying out the presentation, a user boots an application program for presentation and opens a relevant file to carry out the presentation. That is the user is able to sequentially display the slides as the presentation proceeds.

Meanwhile, since the presentation of various reference materials is usually carried out before many viewers, the reference materials to be presented, that is slides, need to be presented at a time to many viewers. So, the presentation is carried out as each slide is demonstrated on a large size screen, using e.g., a projector.

In demonstrating a slide by a projector on a large sized screen, the conventional practice is to convert each slide in the file formulated with the application program for presentation into picture data of a format consistent with e.g., the JPEG (Joint Photographic Experts Group) standard and to display each slide by the projector with the use of the picture data. For converting the file, prepared with the application program for presentation, into picture data, a folder bearing the filename of the file is formulated and, in this folder, the picture data of each slide is stored. The name of the folder is usually formed by letter or character data. That is, the letter or character data, used in the folder name, is prepared with a language supported by an operating system (OS) installed in the personal computer.

However, if a user is to search a folder having stored the picture data of the slide required for the presentations, now to be displayed, it is difficult for the viewer to make retrieval if solely the folder names are resorted to. When the user is unable to find out the data for presentation with solely the folder name, the user has to open the folder to check the picture data in the folder by a laborious operation.

On the other hand, if it is attempted to open a recording medium to check the folder contents, using a device not supporting the letters or characters forming the folder name, the folder name is sometimes displayed in irrelevant letters or characters (so-called garbled letters or characters), with the consequence that the user is unable to distinguish the displayed letters or characters.

DISCLOSURE OF THE INVENTION

It is an object of the present invention to provide methods and apparatus for editing data in such a manner as to permit facilitated search of required data from a recording medium, methods and apparatus for demonstrating picture data and a recording medium having recorded thereon a program for executing the methods and apparatus.

It is another object of the present invention to provide methods and apparatus for editing data in such a manner that data for discrimination may be displayed without dependency on the type of the apparatus or on the sort of the language the apparatus is supporting, and a recording medium having recorded a program required for editing.

It is still another object of the present invention to provide methods and apparatus for demonstrating data in such a manner as to permit data, edited by the above methods and apparatus, to be displayed, that is for demonstrating data in such a manner to permit the required data to be searched readily from the recording medium, and a recording medium having recorded a program necessary for such display.

It is yet another object of the present invention to provide methods and apparatus for displaying data in such a manner that data for discrimination may be displayed without dependency on the type of the apparatus or on the sort of the language the apparatus is supporting, to enable facilitated data retrieval, and a recording medium having recording a program required for editing.

The editing device according to the present invention includes converting means for converting data of a first format, discriminated by an identifier, into picture data of a second format different from the first format, generating means for generating, at the time when the converting means converts the data into the picture data, discrimination picture data for discriminating the picture data converted by the converting means, and for generating data for relevance for correlating the discrimination picture data to the picture data, and recording means for recording the picture data, discrimination picture data and the data for relevance in recording means.

The editing method according to the present invention includes a step of converting data of a first format, discriminated by an identifier, into picture data of a second format different from the first format, a step of generating, at the time of converting the data into the picture data, discrimination picture data for discriminating the converted picture data, and for generating data for relevance for correlating the discrimination picture data to the picture data, and a step of recording the picture data, discrimination picture data and the data for relevance in storage means.

The recording medium according to the present invention has recorded thereon a computer-readable editing program that can be executed by a computer. The editing program includes converting means for converting data of a first format, discriminated by an identifier, into picture data of a second format different from the first format, generating means for generating, at the time when the converting means converts the data to picture data, discrimination picture data for discriminating the picture data converted by the converting means, and for generating data for relevance for correlating the discrimination picture data to the picture data, and recording means for recording the picture data, discrimination picture data and the data for relevance in recording means.

In the recording medium, having recorded the editing program, according to the present invention, in which the data of the first format is converted into picture data of the second format, different from the first format, to generate the discrimination picture data for discriminating the picture data and data for relevance correlating the discrimination picture and the picture data to each other, for recording in preset areas of the recording means, the picture data can be retrieved easily by selecting the discrimination picture data because the picture data and the discrimination picture data are correlated to each other by the data for relevance.

The display device according to the present invention includes readout means for reading out picture data, discrimination picture data and data for relevance for correlating the picture data to the discrimination picture data, from a recording medium, having recorded the picture data, discrimination picture data and the data for relevance, display means for displaying the picture data and the discrimination picture data, read out by the readout means, and controlling means for causing the picture data and the discrimination picture data based on the data for relevance.

The display method according to the present invention includes a readout step of reading out picture data, discrimination picture data and data for relevance for correlating the picture data and the discrimination picture data, from a recording medium, having recorded the picture data, discrimination picture data and the data for relevance, and a step of displaying the discrimination picture data and picture data correlated to the discrimination picture data by the data for relevance on display means.

The recording medium according to the present invention having recorded a computer-readable display program. The recording medium includes means for reading out picture data, discrimination picture data for discriminating the picture data and data for relevance for correlating the picture data to the discrimination picture data, from a recording medium having recorded the picture data, discrimination picture data and the data for relevance, and for displaying the discrimination picture data and the picture data correlated to the discrimination picture data by the data for relevance.

In the recording medium of the present invention, in which the picture data, discrimination picture data for discriminating the picture data and the data for relevance for correlating the picture data and the discrimination picture data to each other are read out from the recording medium having stored these data and in which the discrimination picture data and the picture data correlated to the discrimination picture data by the data for relevance are demonstrated on display means, data necessary for presentation or picture data can be easily retrieved from the discrimination picture data, and displayed, in retrieving the picture data, because the picture data and the discrimination picture data are correlated to each other by the data for relevance.

Other objects, features and advantages of the present invention will become more apparent from reading the embodiments of the present invention as shown in the drawings.

BEST MODE FOR CARRYING OUT THE INVENTION

An embodiment of the present invention, applied to a projector system, is hereinafter explained.

Figure 1:
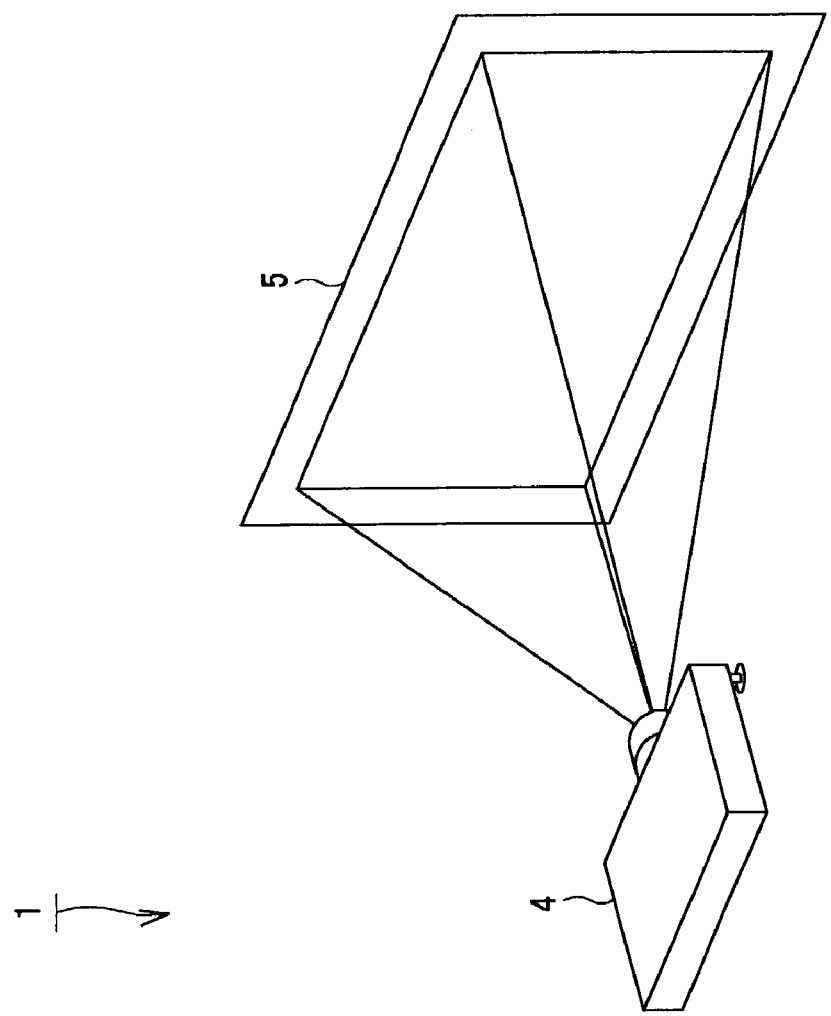
FIG. 1 is a perspective view showing a projector system employed in the present invention.
Figure 1:
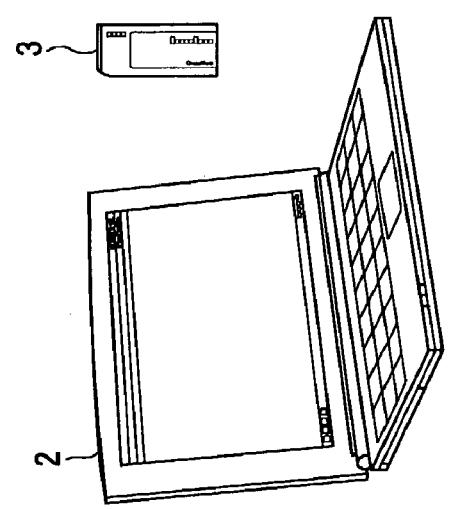

Referring to FIG. 1, the projector system 1 includes an editing device 2 for converting data formulated by the application program for presentation into picture data, picture data for discriminating the picture data and into data for relevance correlated to the picture data and the picture data for discrimination. The projector system 1 also includes an IC (Integrated circuit) card 3, as a recording medium for recording picture data, picture data for discrimination and data for relevance, as converted by the editing device 2, and a display unit 4 for reading out the picture data, picture data for discrimination and the data for relevance, as converted by the editing device 2, from the IC card 3, and for displaying the read-out data.

The editing device 2 operates as converting means for converting data of a first format, discriminated by an identifier, into picture data of a second format different from the first format, by reading in an editing program, as later explained. When the data of the first format is converted into the picture data of the second format, the editing device 2 generates discrimination picture data for discriminating the so converted picture data, while generating data for relevance for correlating the discrimination picture data and the picture data to each other.

The editing device 2 is e.g., a personal computer capable of executing an editing program, adapted for converting data formulated by the application program for presentation into picture data, picture data for discriminating the picture data and into data for relevance correlating the picture data and the picture data for discrimination to each other. The editing device 2 is not limited to a personal computer and may also be a notebook computer or a PDA (Personal Digital Assistant) equipment, capable of executing the above-described editing program.

The IC card 3 may for example be a recording medium having enclosed a semiconductor memory and which may be mounted to or dismounted from the editing device or the display device. When detachably mounted to a mounting/ dismounting unit, such as the editing device 2 or the display unit 4, the IC card 3 stores the picture data, discriminated picture data and the data for relevance, as converted by the editing device 2. That is, the IC card 3 operates as means for storing the picture data, discriminated picture data and the data for relevance. Meanwhile, the recording of data on the IC card 3 loaded on the editing device 2 is carried out by recording means provided in the editing device 2.

The display unit 4 is a liquid crystal type projector, provided with a display screen 5, and which is able to run a display program of reading out the picture data, as converted by the editing device 2, discrimination picture data for the picture data and the data for relevance correlated to the picture data and the discrimination picture data, from the IC card 3, and displaying the picture data and the picture data which are correlated to each other. Meanwhile, the display unit 4 is not limited to the liquid crystal type projector and may be any of the various projectors, TV monitors or computers capable of executing the above-mentioned display program.

Figure 2:
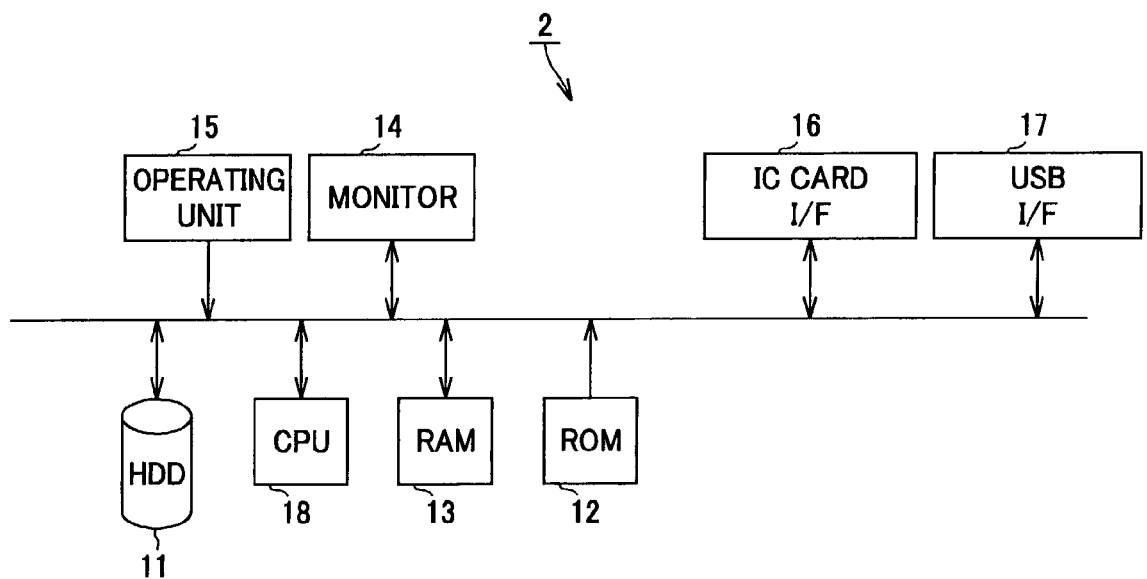
FIG. 2 is a block diagram showing the structure of an editing apparatus.

Referring to FIG. 2, the editing device 2, used for the projector system 1, to which the present invention is applied, is now explained in detail.

The editing device 2 includes an HDD (Hard Disc Device) 11, for storing a variety of application proframs, such as OS or programs running thereon, and a variety of data, a ROM (Random Access memory) 12 in which the various application programs or various data are stored, a RAM (Random Access memory) 13 for transiently loading the various application programs or data, a monitor 14 for displaying the various data as well as the results of execution of the various application programs, an operating unit 15, such as a keyboard or a mouse, an IC card I/F (Interface) 16 for connection to the IC card 3, an USBI/F (Universal Serial Bus interface) 17 for connection to a USB (Universal Serial Bus) cable, interconnecting the editing device 2 and the display unit 4, and a CPU (Central Processing Unit) 18 for controlling the overall editing device 2.

When a user inputs a boot command at the operating unit 15 for booting the desired application program stored in the HDD 11, the CPU 18 reads out and executes the required program from the HDD 11 or from the ROM 12.

For example, if the user converts data, formulated by the application program for presentation, into picture data for demonstration on the display unit 4, the user acts on the operating unit 15 to click an icon displayed on the monitor 14 to boot the above program. This causes the editing program to be read out to the RAM 13 and executed by the CPU 18. When the editing program is executed, the user is able to convert the data, formulated by the application program for presentation, into picture data, discrimination picture data and the data for relevance, extremely readily, and to save the so converted picture data, discrimination picture data and the data for relevance in for example the IC card 3.

Specifically, the editing program converts the data formulated by the application program for presentation, that is a file of a set of slides used for presentation, into picture data conforming to the JPEG standard and to the DCF (Design Rules for Camera File Systems) standard. In order to make the data contents more readily discernible for the user, the editing program generates discrimination picture data conforming to the JPEG and DCF standards, by an identifier including letter or character data of pre-conversion data, and also generates data for relevance for relating the picture data and the discrimination picture data to each other. The picture data, discriminated picture data and the data for relevance are saved in a preset area of for example the IC card 3.

Figure 3:
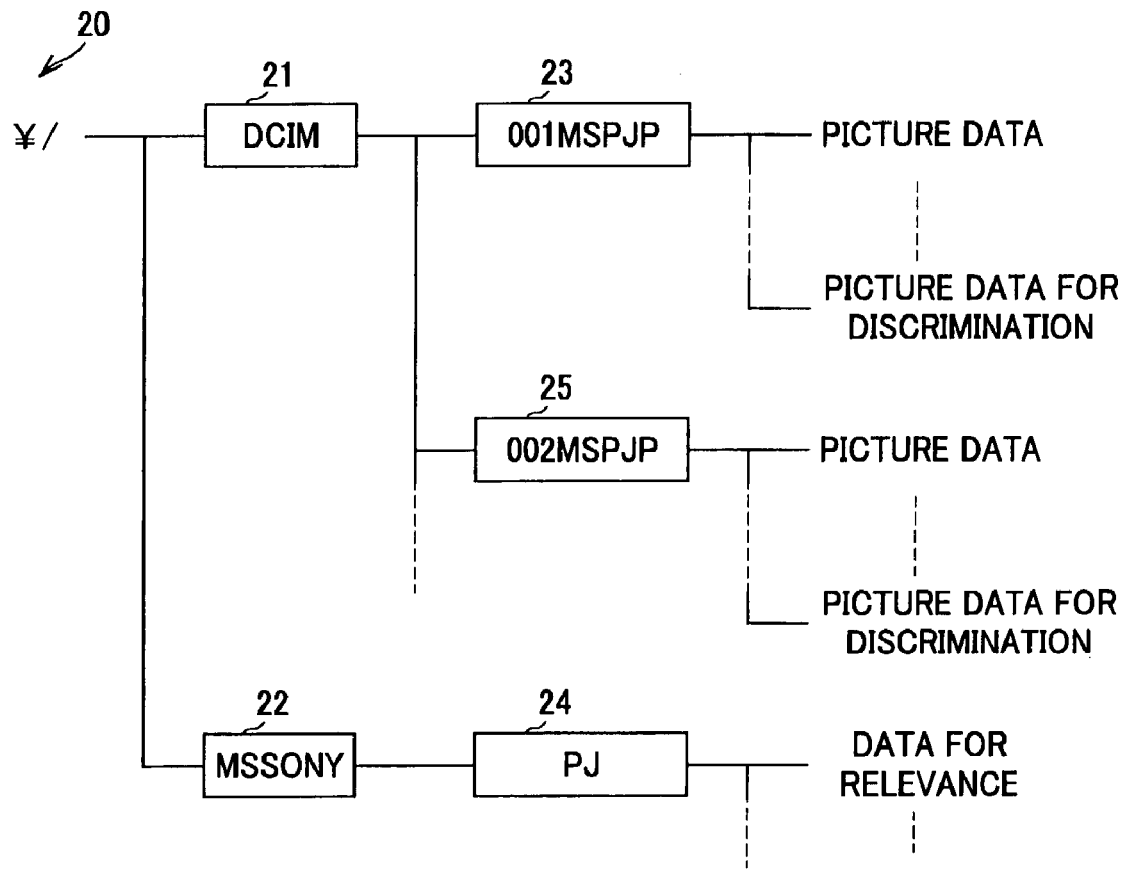
FIG. 3 is a schematic view showing a hierarchical structure of the files in an IC card.

The picture data, discriminated picture data and the data for relevance are saved in the IC card 3 in a hierarchical file structure conforming to the DCF standard. More specifically, these data are saved as files in respective folders of a hierarchical structure, as shown in FIG. 3. In a root directory, a first folder 21, having a folder name of "DCIM", and a second folder 22, having a folder name of "MSSONY", are generated, as shown in FIG. 3. In the first folder 21, there is generated a third folder 23, having a folder name of "001MSPJP", in association with a file as formulated by the application program for presentation. In this third folder 23, the picture data and the discrimination picture data are saved as a picture file (a file with an extension of e.g., jpg). In the second folder 22, a fourth folder 24 having a folder name "PJ" is generated in the second folder 22. In this fourth folder 24, data for relevance for correlating the picture data for discrimination and the picture data, making up the slide, is stored as a setting file. The setting file is such a file in which the extension is for example set to spp.

When it is desired to further save in the IC card 3, having stored therein data as described above, data prepared by a further application program for presentation, and subsequently converted, as described above, a fifth folder 25 having a folder name of, for example, "002MSPJP", different from the filename of the third folder 23, is generated in the first folder 21. In this fifth folder 25, the new picture data and new picture data for discrimination are stored. The new data for relevance is also saved in the fourth folder 24 with a filename different from that of the already stored data for relevance. In a similar sequence of operations, plural data formulated by the application program for presentation may be converted as described above and saved in the IC card 3.

The editing program converts the filenames of data formulated by the application program for presentation from letter or character data into picture data to generate the aforementioned picture data for discrimination. That is, when converting the data of the first format into picture data of the second format different from the first format, the editing program operates as data converting means to generate discrimination picture data for discriminating the as-converted picture data, while operating as means for generating data for relevance used for correlating the picture data for discrimination to the picture data.

The aforementioned picture data for discrimination may also be formulated as the discrimination name composed of optional letter or character data, as changed by the user for facilitated discrimination, is converted int picture data. In addition to converting the filename or optional letter or character data into picture data for facilitated discrimination, the picture data for discrimination may also be formulated as picture data converted from the letter or character data is combined with an optional favorite background. In addition, the background picture color may be changed, or optional picture data may be specified for use as background.

As the data for relevance, there are recorded the site of storage of the picture data, site of storage of the picture data for discrimination, the display sequence of various picture data, that is the sequence in which the slides are displayed in presentation, and various settings of displaying the various picture data.

Figure 4:
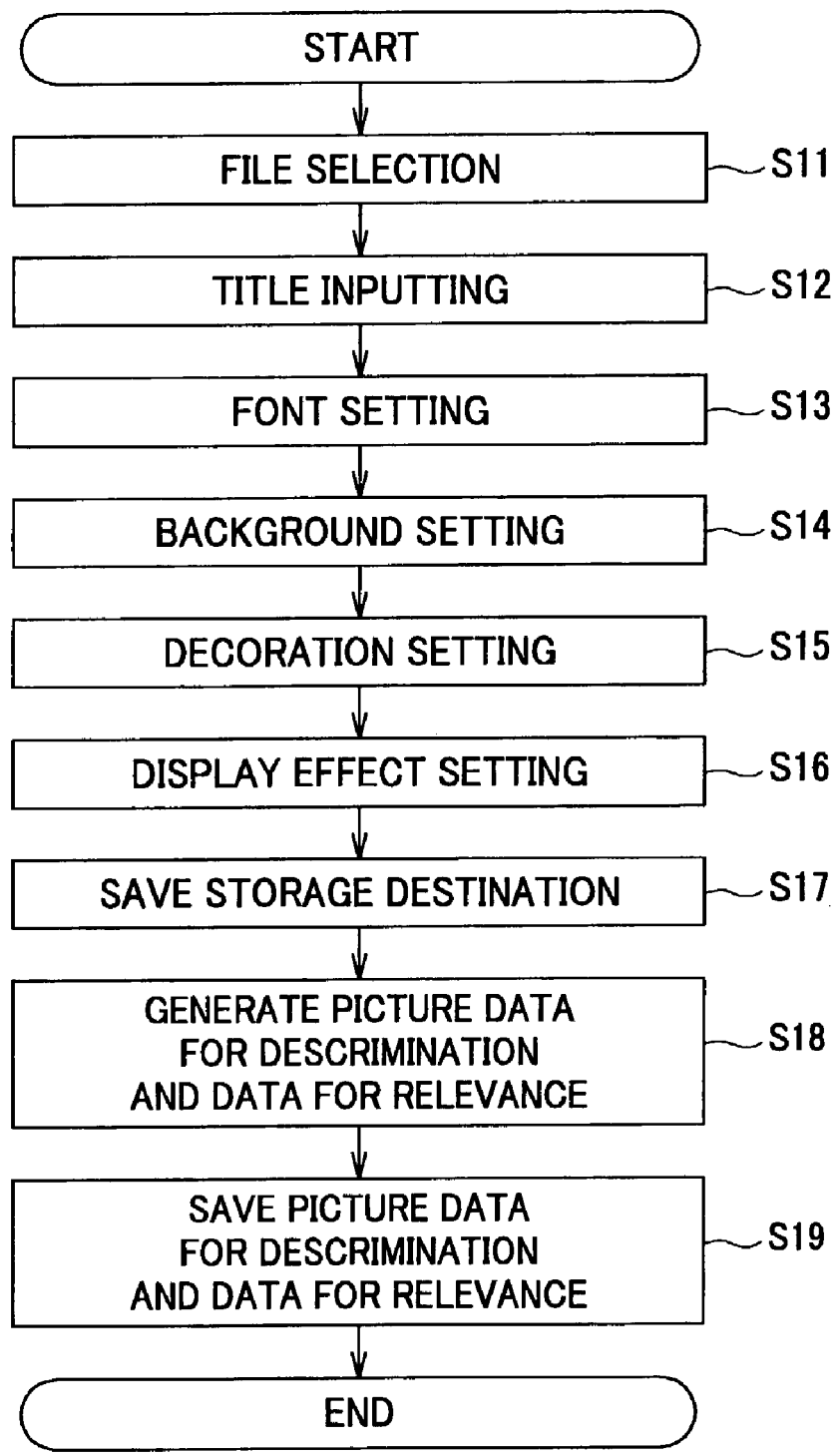
FIG. 4 is a flowchart for illustrating the processing sequence in an editing program.

The sequence of executing the file editing program is now explained by referring to the flowchart shown in FIG. 4.

Figure 5:
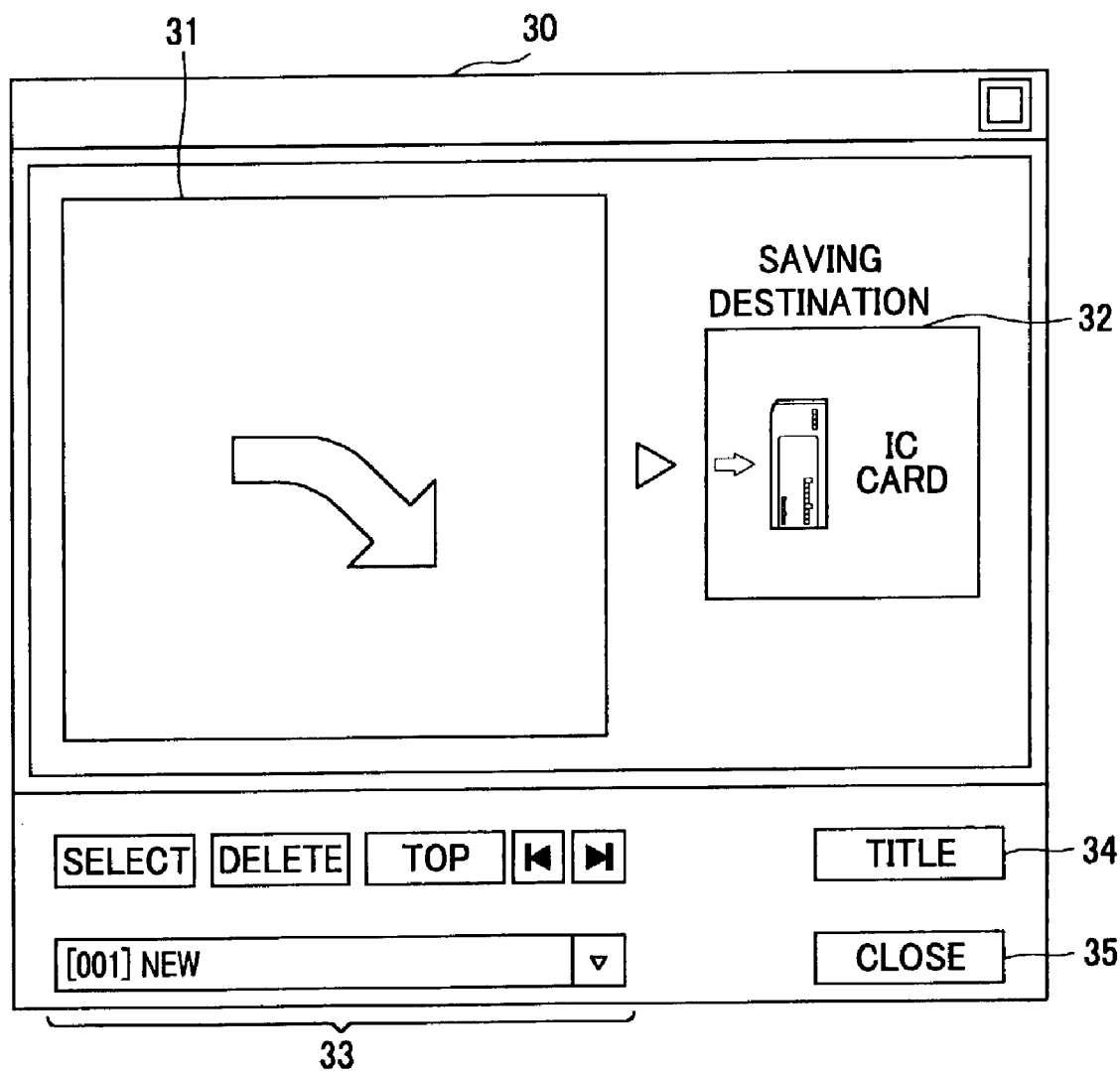
FIG. 5 shows a basic picture of an editing program displayed on a monitor.
Figure 6:
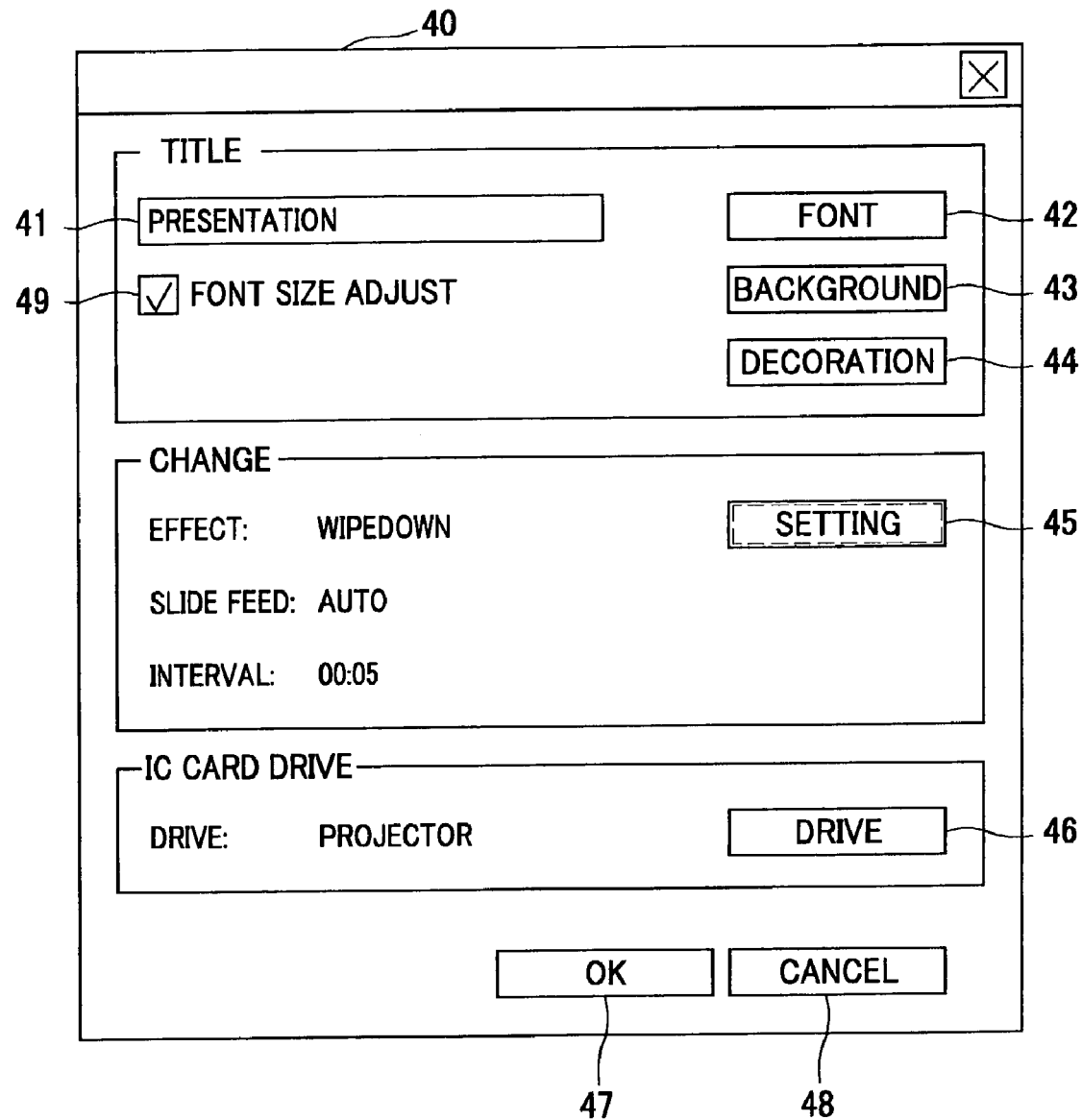
FIG. 6 shows a picture for setting an editing program displayed on a monitor.

At step S11, the user acts on the operating unit 15 to click an icon displayed on the monitor 14. This causes the program to be read out to the RAM 13 for execution by the CPU 18. The user then acts on the operating unit 15 to select the data for presentation the user desires to edit. Specifically, an initial picture 30 shown in FIG. 5 is displayed on the monitor 14. Using e.g., a mouse, the user performs the so-called drag-and-drop of selecting a file of data formulated by the application program for presentation to shift it to a data inputting section 31 provided in the initial picture 30.

The initial picture 30 is provided with the data input section 31 for moving a file prepared by the application program for presentation by drag-and drop for processing by the editing program, a storage destination display section 32 for displaying the specified storage destination, an edit button 33 for data editing, a title button 34 for displaying an edit picture for editing picture data for discrimination, and an end button 35 for terminating the program, in order to enable the user to perform selective operations.

At the next step S12, the user acts on the operating unit 15 to select a title button 34 in the initial picture 30. This causes the CPU 18 to display an editing picture 40, shown in FIG. 14, on the monitor 14. If a title inputting section 41, provided in the editing picture 40, is selected, responsive to a user operation on the operating unit 15, and a title is input from e.g., a keyboard, the CPU 18 demonstrates letter or character data, as input to the title inputting section 41. In this manner, the user is able to set a desired title. As an initial condition, a filename of data to be converted is displayed in the title inputting section 41. In the present embodiment, letter or character data, that is a title, is necessarily entered in the title inputting section 41 and, lacking the input, an alerting display is made, or the filename is used as a title.

If, at step S13, the user operates the operating unit 15 to select a font button 42 provided in the editing picture 40, the CPU 18 displays a font setting picture, setting the font, on the monitor, in a manner not illustrated in detail. In this font setting picture, types of fonts, such as Ming-style characters or gothic letters, style of fonts, such as thick letters or characters or italic letters, font sizes, underlines, crossing-out lines or font ornaments, such as font colors, may be set.

If the user at step S14 acts on the operating unit 15 to select a background button 43 provided in the editing picture 40, the CPU 18 displays a background editing picture for setting the background on the monitor 4, in a manner not illustrated in detail. In this background editing picture, the background color of picture data for discrimination, or background picture data used as background, may be selected. It is noted that, as an initial condition, plain texture and black color are set as the background for the picture data for discrimination, so that, lacking the user's selection of the background button 43, the background of the picture data for discrimination is of the plain texture and the black color.

If the user at step S15 acts on the operating unit 15 to select an ornament button 44 provided on the editing picture 40, the CPU 18 displays an ornament setting picture for ornament setting on the monitor 14, in a manner not illustrated in detail. With this ornament setting picture, various ornaments can be set to the title of the picture data for discrimination. Among the setting items for ornamentation, ornamentation such as shading may be selected.

If the user st step S16 acts on the operating unit 15 to select a setting button 45 provided in the editing picture 40, the CPU 18 displays a display setting picture on the monitor 14, for making setting for displaying picture data, in a manner not illustrated in detail. On this display setting picture, it is possible to set the effect for displaying picture data as the picture data is slid, automatic or manual setting for slide feed, or the slide feed time or interval in case the automatic slide feed is set.

If the user at step S17 acts on the operating unit 15 to select a drive button 46 provided in the editing picture 40, the CPU 18 displays a storage destination setting picture, for setting the storage destination, on the monitor 14, in a manner not illustrated in detail. On this storage destination setting picture, the sites for storage of the as-converted picture data, picture data for discrimination and the data for relevance may be selected. If the IC card 3 is the site of storage, the editing device 2 or the display unit 4 may be selected as a device for insertion of the IC card 3. Alternatively, the HDD 11 may be used as the site for storage.

If the user at step S18 acts on the operating unit 15, such that an execution button 47 provided on the editing picture 40 is selected, the CPU 18 generates picture data, picture data for discrimination and the data for relevance, from data formulated from the application program for presentation, based on the setting of the aforementioned steps S12 to S16.

At step S19, the CPU 18 saves the picture data, discrimination picture data and the data for relevance in the sites for storage as specified at step S17, based on the editing program sequence. If the site for storage is the IC card 3, the CPU 18 causes the picture data and the discrimination picture data in the third folder 23 shown in FIG. 3, so that, with the extension jpg, the picture data and the discrimination picture data will have different filenames. On the other hand the CPU stores the data for relevance in the fourth folder 24 under a filename different from that of the data for relevance previously saved with the extension of spp.

With the above processing flow, the editing program comes to a close. Meanwhile, the sequence of steps S12 to S17 may be interchanged. If in the editing program, it is not desired to carry out the aforementioned data conversion, the user acts on the operating unit 15 to select a cancel section 48 provided in the editing picture 40. With the selection of the cancel section 48, the editing program discontinues the aforementioned data conversion. As aforesaid, the user is able to select the font section 42 to change the font size. By the user pre-selecting a font size adjustment section 49 in the editing picture 40, the title can be displayed with a suitable size in the discrimination picture data.

The aforementioned display unit 4 is now explained in detail.

Figure 7:
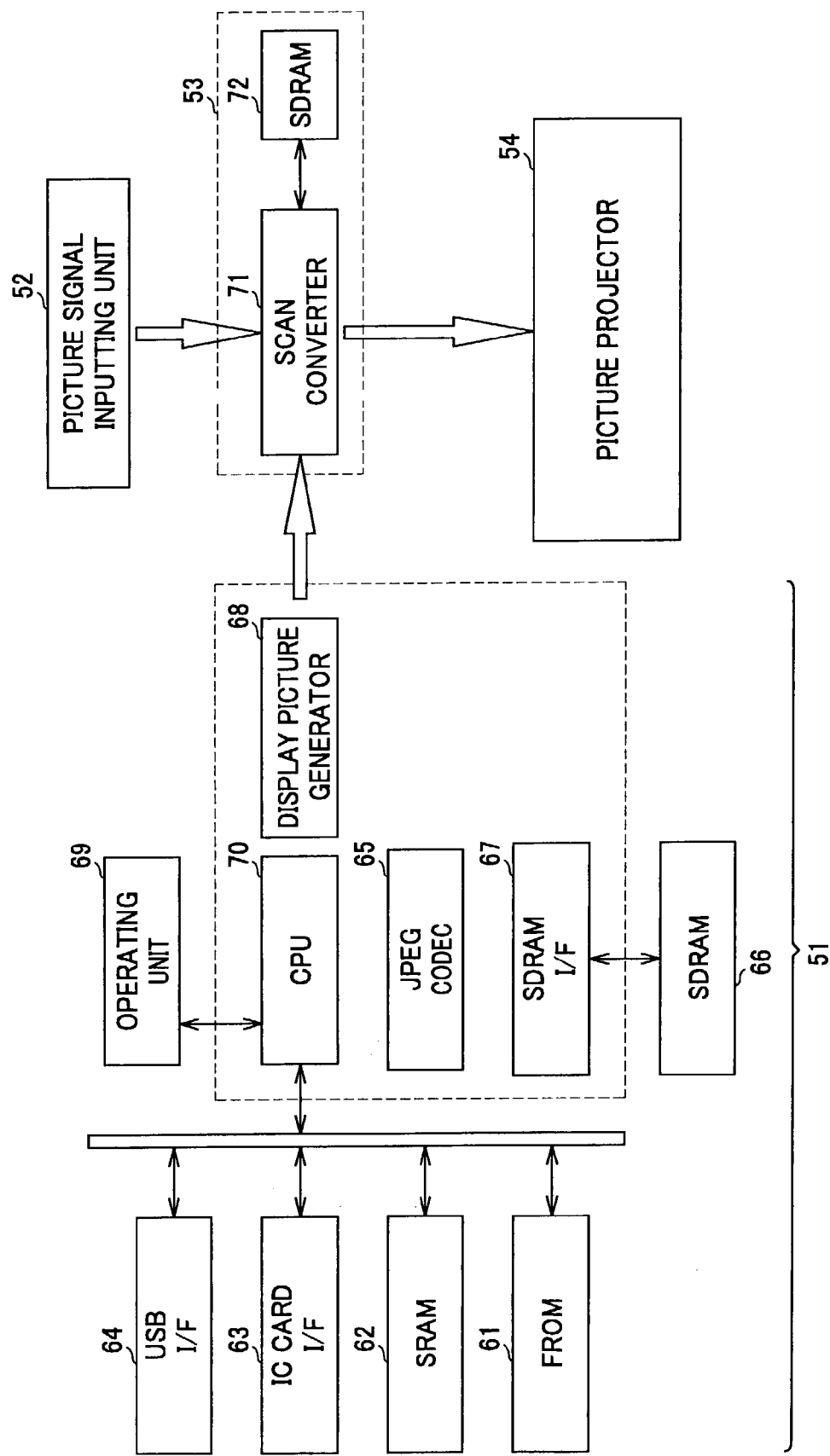
FIG. 7 is a block diagram showing the structure of a display apparatus of the projector system employed in the present invention.

Referring to FIG. 7, the display unit 4 includes a picture signal generating unit 51 for generating picture signals by reading out the picture data, discrimination picture data and the data for relevance from the IC card 3, a picture signal inputting unit 52 connected to an external equipment and which is adapted to be supplied with picture signals from this external equipment, a picture signal adjustment unit 53 for adjusting the picture signals input from the picture signal generating unit 51 or the picture signal inputting unit 52 and a picture projection unit 54 for projecting a picture on a screen 5 based on the picture signals input from the picture signal adjustment unit 53.

The picture signal generating unit 51 forming the display unit 4 includes an FROM (Flash Read Only Memory) 61, in which there are stored various application programs or data, an SRAM (Static Random Access memory) 62 to which the various application programs or data are transiently read out, an IC card I/F 63, connected to the IC card 3, a USBI/F 64, to which is connected a USB cable interconnecting the display unit 4 and the external equipment, a JPEG codec 65 for encoding/decoding the picture data and the discrimination picture data, read out from the IC card 3, in accordance with the JPEG standard, an SDRAM (Synchronous Dynamic Random Access Memory) 66 for transiently storing the data for encoding/decoding by the JPEG codec 65, an SDRAMI/F (Synchronous Dynamic Random Access Memory Interface) 67 for interconnecting the JPEG codec 65 and the SDRAM 66, a display picture generating unit 68 for generating the picture signal by converting the picture data and the discrimination picture data as well as the results of the application program from digital data into analog data to generate picture signals and for outputting the so generated picture signal, an operating unit 69, comprised e.g., of a remote controller, and a CPU 70 for managing control in reproducing data edited by the editing device 2.

The picture signal inputting unit 52 is connected to an external equipment, a video tape recorder, a laser disc player, a personal computer or a TV game equipment, for outputting picture signals, as analog signals, input from these external equipment, to the picture signal adjustment unit 53.

The picture signal adjustment unit 53 includes an SDRAM 72 for transiently storing picture signals input from the picture signal generating unit 51 or from the picture signal inputting unit 52, and is arranged so that a picture will be suitably projected by the picture projection unit 54.

The picture projection unit 54 is arranged so that light from a light source is illuminated on an LCD (Liquid Crystal Display) panel which is designed to effect light modulation based on input picture signals, and so that the light modulated by the LCD panel is projected as an enlarged image corresponding to the picture signals by e.g., an objective lens.

In the display unit 4, comprised of the picture signal generating unit 51, picture signal inputting unit 52, picture signal adjustment unit 53 and the picture projection unit 54, when the IC card 3, having stored the picture data, discrimination picture data and the data for relevance, as converted by the editing device 2, is connected to the IC card I/F 63, and the user acts on the operating unit 69, the display program is loaded from the FROM 61 to the SRAM 62 so that the display program is executed by the CPU 70. The picture data and the discrimination picture data, read out from the IC card 3, is decoded by the JPEG codec 65 in accordance with the JPEG standard, and output to the display picture generating unit 68.

The display picture generating unit 68 combines a menu picture, desired to be displayed by the CPU 70 on the projector system 1, the decoded picture data and discrimination picture data, and outputs the combined data to a scan converter 71 as picture signals converted into analog or digital signals. The scan converter 71 saves the input picture signals in the SDRAM 72 and adjusts the picture signals to a level matched to the picture projection unit 54 to output the adjusted picture to the picture projection unit 54. The picture projection unit 54 then enlarges the output signal depending on the picture signals for projection on the screen 5.

Specifically, the CPU 70 reads out the picture data, discrimination picture data and the data for relevance, as converted by the aforementioned editing program, from the IC card 3, and demonstrates the menu picture and the data for relevance on the screen 5. When the user acts on the operating unit 69 to select the discrimination picture data, the picture data, stored with relevance to the discrimination picture data by the data for relevance, can readily be projected on the screen.

Figure 8:
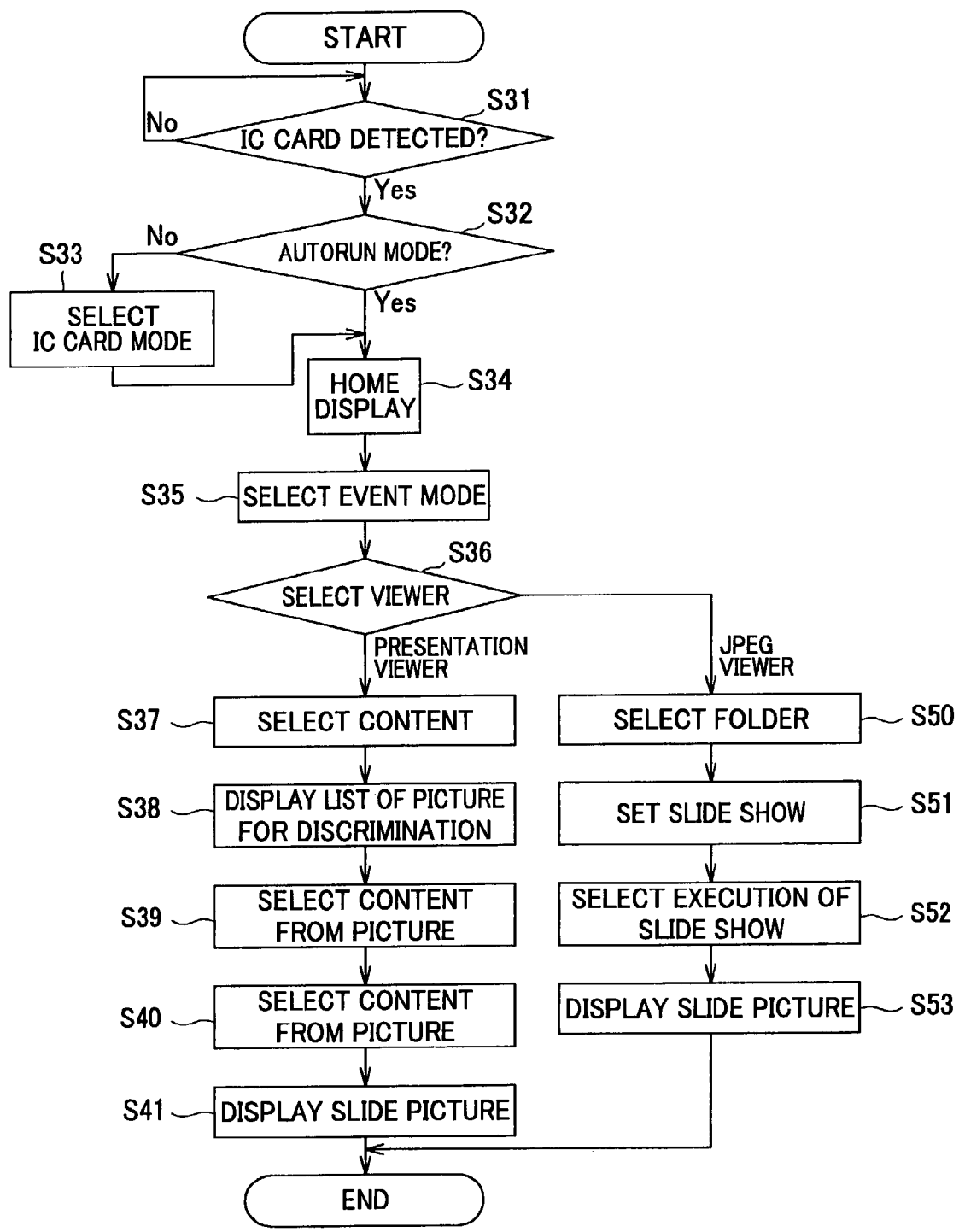
FIG. 8 is a flowchart showing the processing sequence of a display program.

The sequence of the operation of executing the display program is now explained with reference to the flowchart show in FIG. 8.

On power up of the display unit 4, the display program is read out from the FROM 61 to the SRAM 62 for execution by the CPU 70.

At step S31, the CPU 70 verifies whether or not the IC card 3 has been loaded on the IC card I/F 63. If the IC card 3 is loaded, the CPU proceeds to step S32.

At step S32, the CPU 70 verifies whether or not the current mode is the auto-run mode. If the auto-run mode has not been set, the CPU proceeds to step S33. If conversely the auto-run mode has been set, the CPU proceeds to step S34. The auto-run mode is such a mode in which, if the CPU 70 has found that the IC card 3 has been loaded on the IC card I/F 63, data in the IC card 3 is read in automatically.

If the user at step S33 acts on the operating unit 69 to set the IC card mode, the CPU 70 proceeds to step 34.

Figure 9:
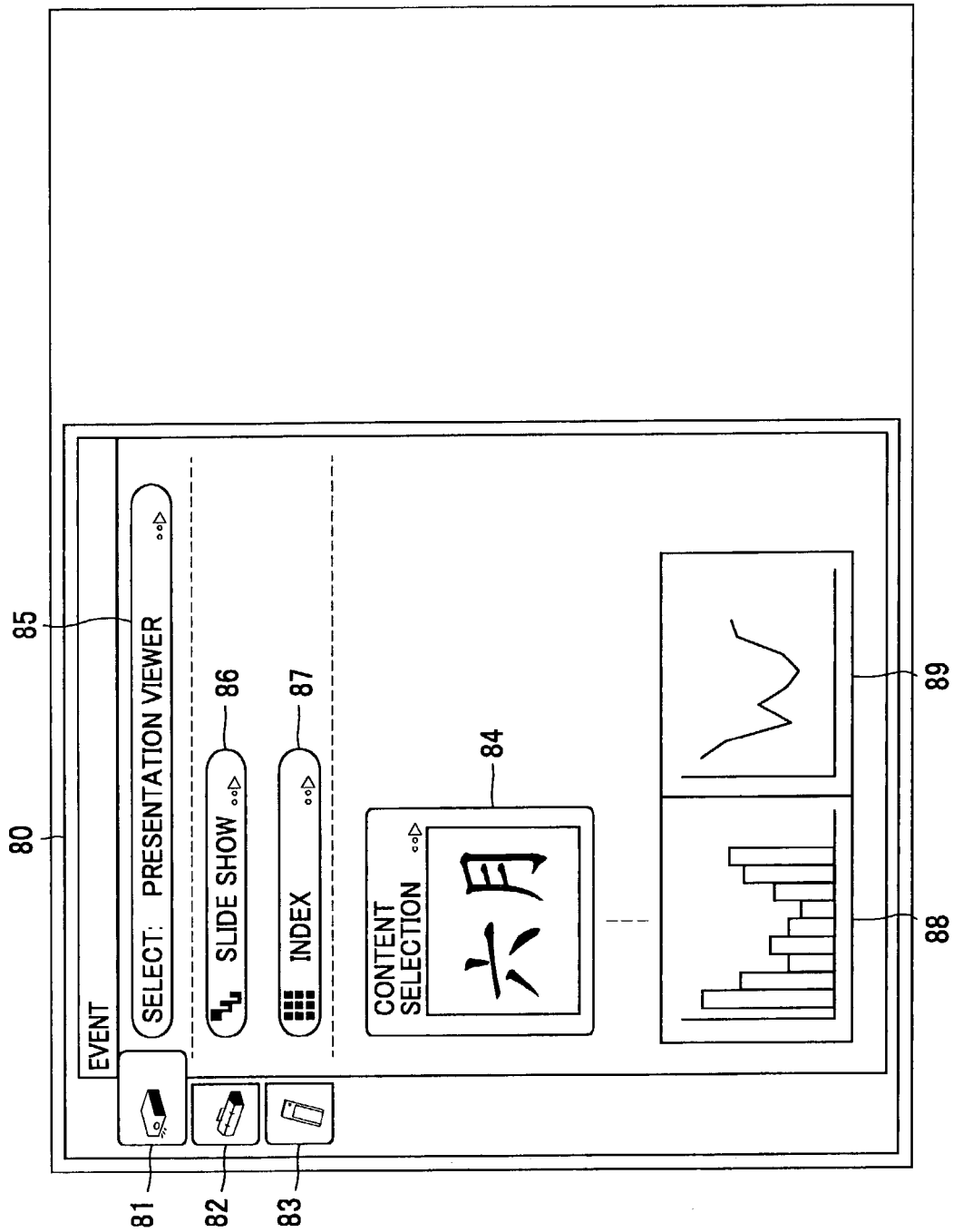
FIG. 9 shows a basic picture of a display program projected on a screen.

At step S34, the CPU 70 projects a display section 80, as a home page, which is an operating picture, shown in FIG. 9, on the screen 5.

Then, at step S35, the user acts on the operating unit 69 to select an event section 81 provided in the display section 80. Within the display section 80, there are provided a setting section 82 for basic setting for display, as later explained, an IC card section 83, for formatting the IC card 3, a content selection section 84 for selecting the picture data, making up the slide to be displayed, a viewer selecting section 85 for selecting a viewer for presentation or a viewer for displaying a JPEG picture, a slide show section 86 for executing the slide show, that is presentation, an index section 87 for displaying the list of contents of the picture data forming a slide, and picture display sections 88, 89 for displaying a picture used for presentation.

Figure 10:
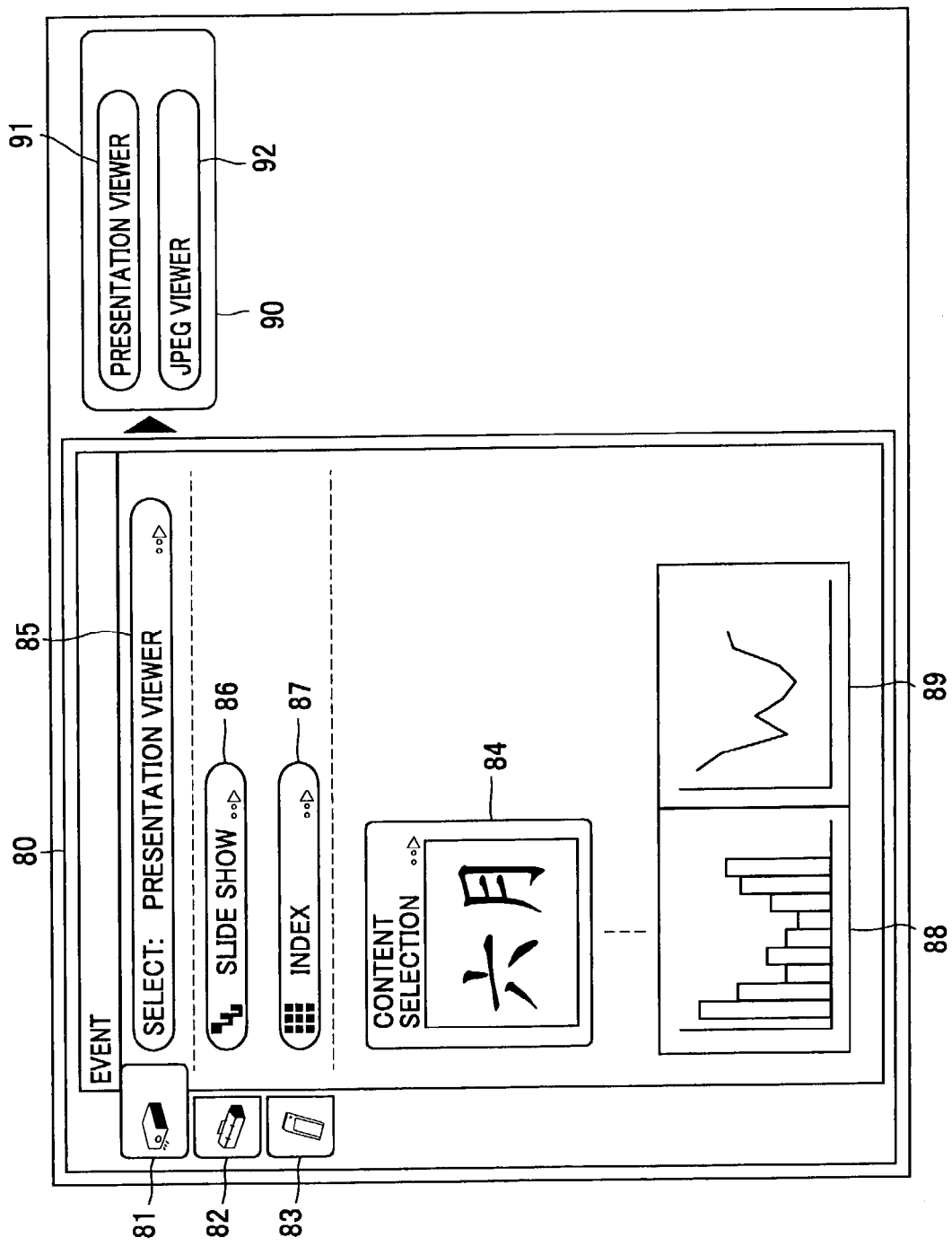
FIG. 10 shows a picture for viewer selection of the display program projected on a screen.

The user then acts at step S36 on the operating unit 69 to select the viewer selecting section 85 provided in the display section 80. This causes the CPU 70 to project a display section 90 for viewer selection shown in FIG. 10 on the screen 5. The user acts on the operating unit 69 to select a presentation viewer 91 or a JPEG viewer 92 provided in the display unit 90. If the presentation viewer 91 has been selected, the CPU 70 proceeds to step S37, whereas, if the JPEG viewer 92 has been selected, the CPU proceeds to step S50.

At step S37, the user acts on the operating unit 69 to select the content selection section 84 provided in the display section 80.

Figure 11:
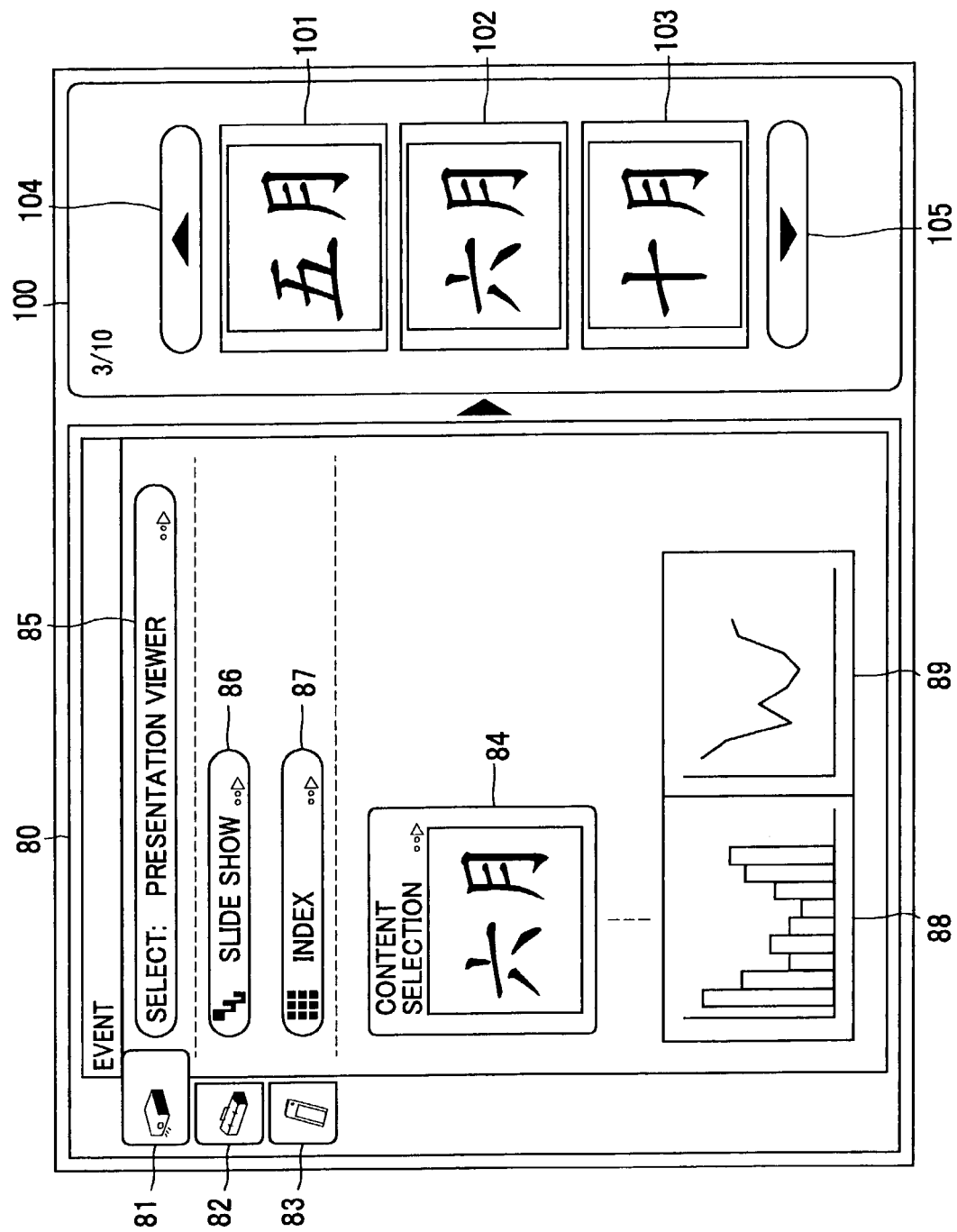
FIG. 11 shows a picture of content selection in case of selection of a presentation viewer of the display program projected on a screen.
Figure 12:
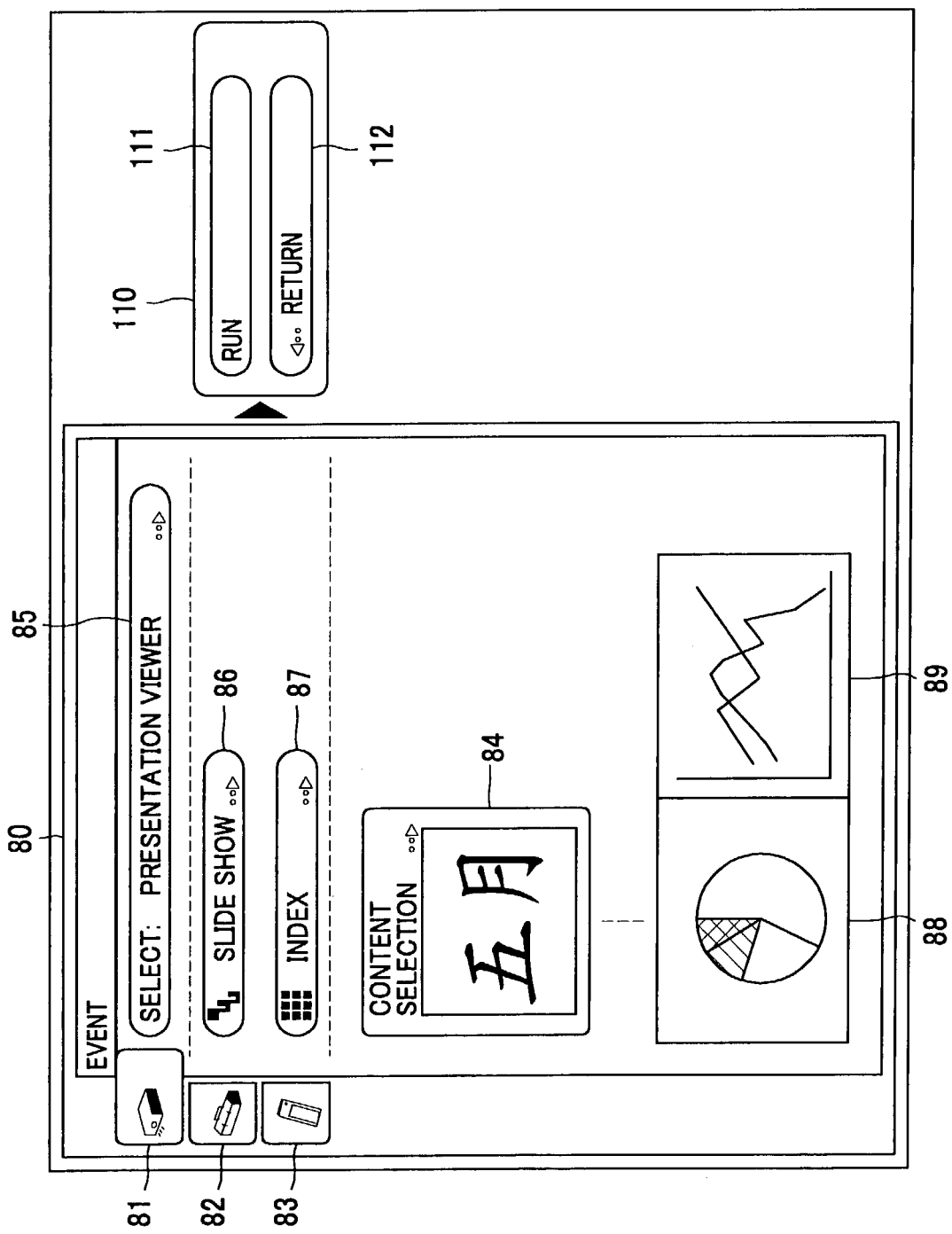
FIG. 12 shows a picture for selection of execution of a slide show in case of selection of a presentation viewer of the display program projected on the screen.

Then, at step S38, the CPU 70 projects a display section 100, shown in FIG. 11, on the screen 5. The display section 100 is adapted for displaying the discrimination picture data. Within this display section 100, there are provided discrimination picture data display sections 101, 102, 103, adapted for displaying the discrimination picture data as thumbnails. Within these discrimination picture data display sections 101 to 103, the discrimination picture data, stored in respective folders within the first folder 21 of the IC card 3, shown in FIG. 3, are displayed.

Then, at step S39, the user acts on the operating unit 69 to select discrimination picture data selection sections 104, 105 provided in the display section 100. This causes the CPU 70 to switch between discrimination picture data demonstrated in the discrimination picture data display sections 101 to 103. When the user acts on the operating unit 69 to select one of the discrimination picture data display sections 101 to 103, the CPU 70 demonstrates the discrimination picture data, selected as described above, in the content selection section 84, and reads out the data for relevance, which relates the picture data and the discrimination picture data to each other, from the fourth folder 24. Based on the so read out data, the CPU demonstrates two picture data on the picture data display sections 88, 89 from the leading end in the display sequence from within the preset folder, such as third folder 23.

The user then at step S40 acts on the operating unit 69 to select the slide show section 86 provided within the display section 80. This causes the CPU 70 to project the display section 110 on the screen 5. The user acts on the operating unit 69 to display the slide show, that is the slide, on the screen 5, to select an execution section 111 provided in the display section 110. Meanwhile, there is provided a return section 112 in the display section 110. This return section is selected by the user in case the slide show is not to be executed.

At step S41, the CPU 70 sequentially displays picture data, correlated by the data for relevance with the discrimination picture selected on the screen 5, based on the setting of the data for relevance. When the display comes to a close, the display program is terminated.

Figure 13:
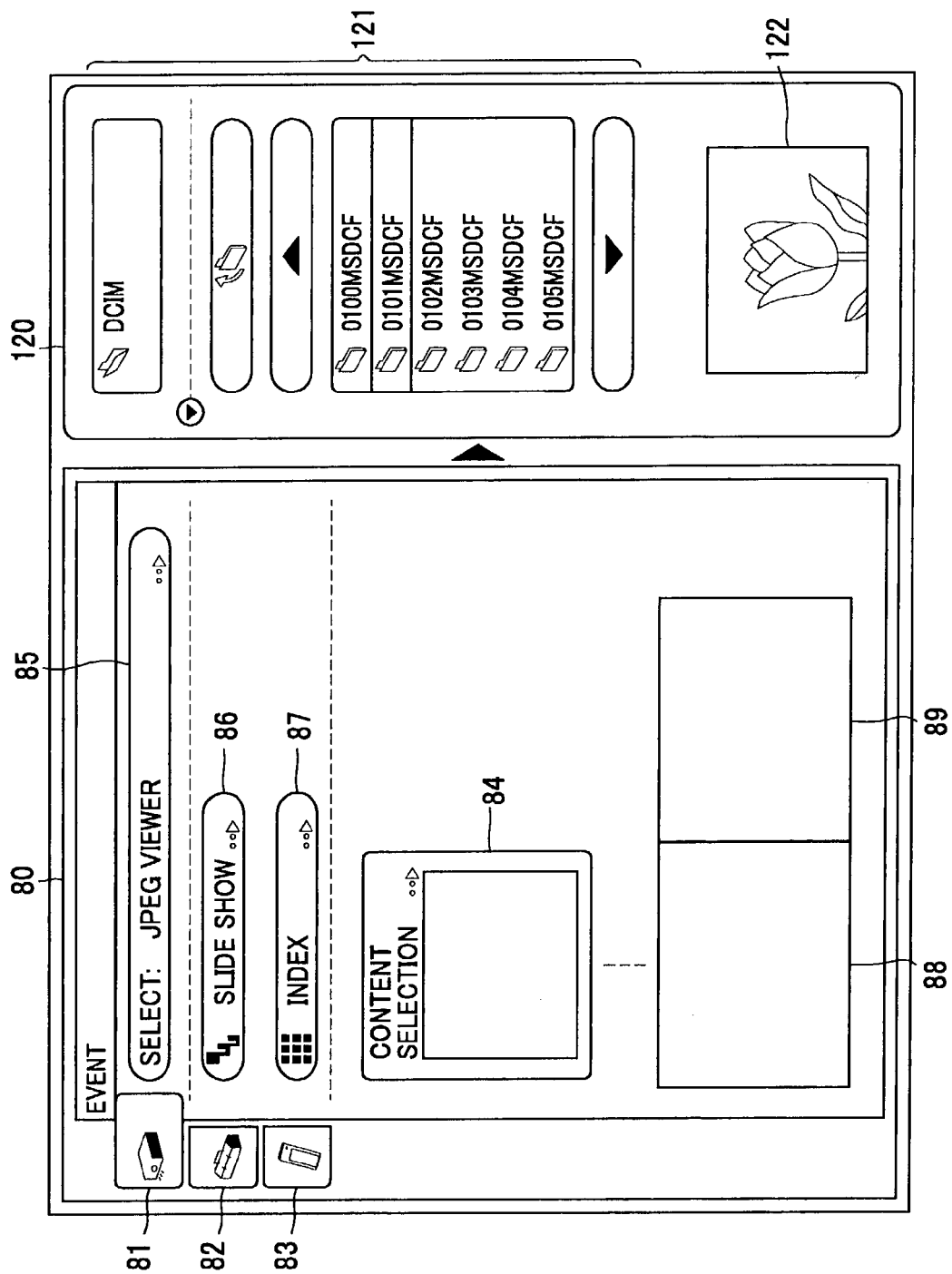
FIG. 13 shows a picture of content selection in case of selection of a JPEG viewer of the display program projected on a screen.

If the user at step S50 selects the JPEG viewer, the CPU projects a display section 120 on the screen 5 as shown in FIG. 13. In this display section 120, there are provided a folder selection section 121 for displaying the name of a folder holding the picture data, and a picture data display section 122 for displaying the leading picture data saved in the folder the user is about to select. Thus, the user selects the operating unit 69 and references the first picture data displayed in the picture data display section 122 to select the desired folder from the folder selection section 121. Thus, the CPU 70 displays the two picture data, in the display sequence, along with the discrimination picture data.

Figure 14:
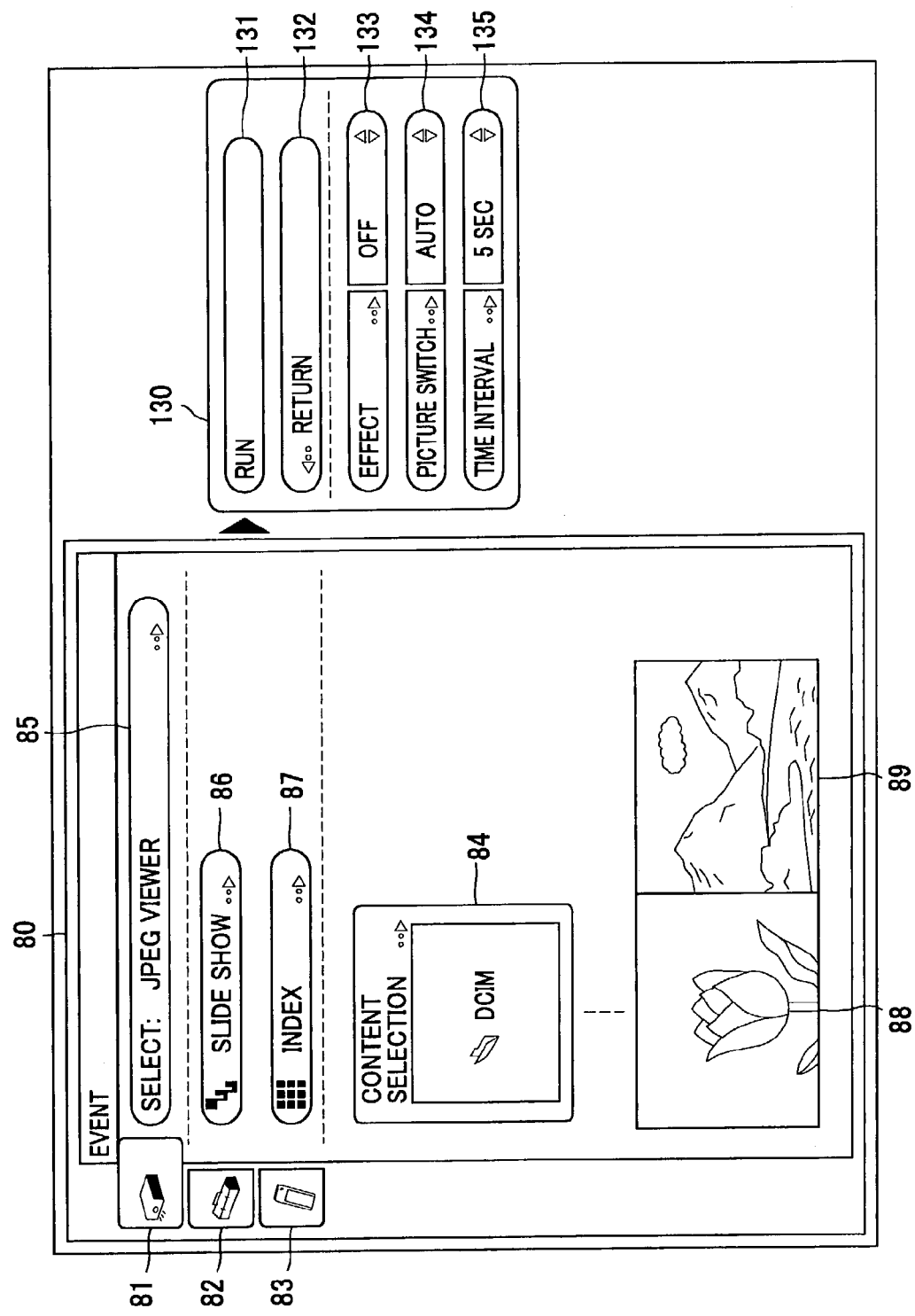
FIG. 14 shows a picture for selection of execution of a slide show in case of selection of selection of the JPEG viewer of the display program projected on a screen.

At the next step S51, the user acts on the operating unit 69 to select the slide show section 86. Based on this selection, the CPU 70 projects a display section 130 on the screen 5, as shown in FIG. 14. The display section 130 includes an execution section 131 for executing the slide show, a return section 132 for returning the processing without executing the slide show, and setting sections 133, 134 and 135 for making various settings of the slide show. The user acts on the operating unit 69 and selects necessary ones of the setting sections 133, 134 and 135 to effect various settings for the slide show to select the execution section 131.

The CPU 70 at step S53 sequentially projects picture data on the screen 5, based on the above setting, to terminate the processing.

Figure 15:
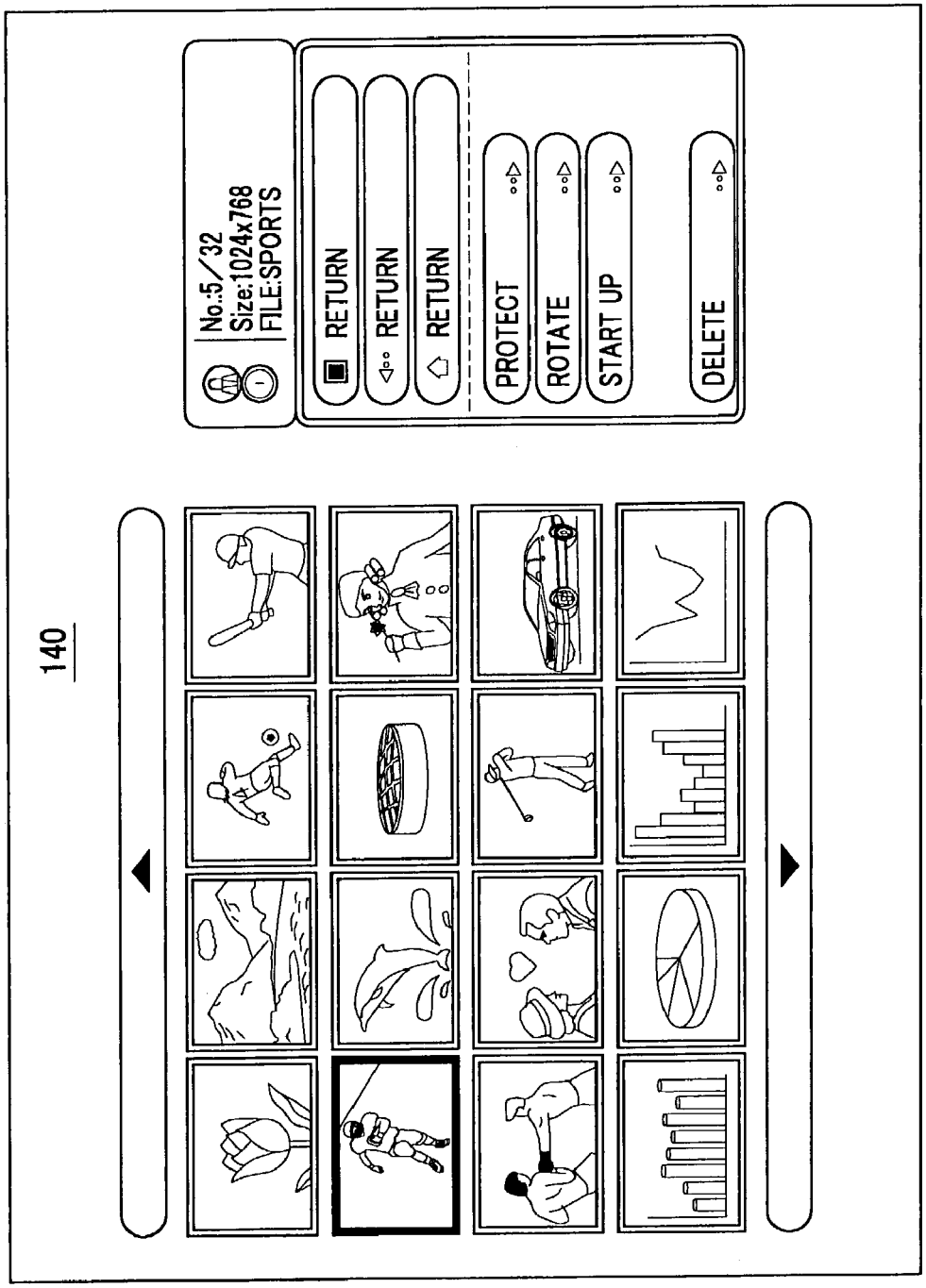
FIG. 15 shows an index picture of a display program projected on a screen.
Figure 16:
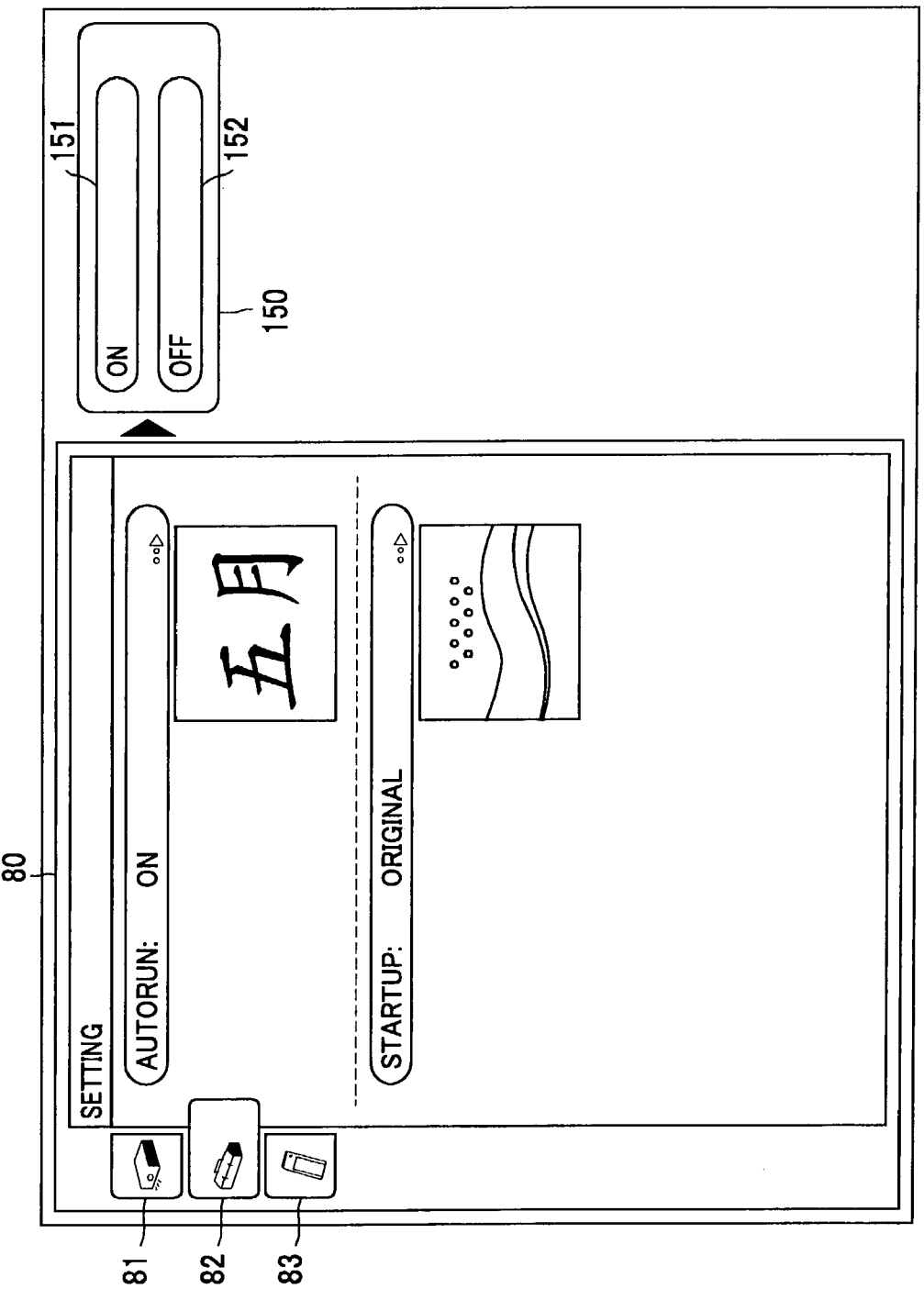
FIG. 16 shows a picture for automatic run mode of the display program projected on a screen.

By the user acting on the operating unit 69 to select the index section 87, the CPU projects a display section 140 on the screen 5 to display a list of the picture data in the folder, as selected by the user, as shown in FIG. 15, although this is not stated in any of the above steps. The user is able in this manner to specify picture data to be displayed, that is slides, one by one for projection on the screen 5. By the user acting on the operating unit 69 to select the setting unit 82, the CPU 70 is able to project a display section 150 on the screen 5, as shown in FIG. 16. Meanwhile, the display section 150 includes an on-setting section 151 for setting the auto-run mode on and an offsetting section 152 for setting the auto-run mode off, such that, by the user acting on the operating unit 69, the auto-run mode can be turned on and off. Moreover, the user acts on the operating unit 69 to select the IC card 3 to initialize data in the IC card 3 by way of formatting.

By the CPU 70 running the display program, and by the user acting on the operating unit 69 to select the discrimination picture data, the picture data associated with the discrimination picture data can readily be demonstrated to effect prompt presentation.

With the above-described projector system 1 according to the present invention, it is possible not only to convert data, formulated by the application program for presentation into picture data conforming to the JPEG standard, from one slide to another, but also to generate the filename of the data prepared by the application program for presentation as discrimination picture data consistent with the JPEG standard, and to formulate data for relevance correlating the picture data and the discrimination picture data to each other, for recording on the IC card 3. Thus, in retrieving picture data used for desired presentation from the IC card 3, in executing the presentation, desired picture data can readily be demonstrated simply by selecting discrimination picture data that can readily be discriminated by the user.

In the device so far used or proposed, the filenames prepared with a language not supported by the device cannot be appropriately displayed in retrieving from the filename, while garbled letters or characters are encountered, such that basically only alphabetical letters, numerical figures and part of symbols can be demonstrated. According to the present invention, the filenames or letters and characters can be displayed, without dependency on the language supported by the device, provided that the filenames or letters and characters have been rendered into the discrimination picture data.

Since the background of the discrimination picture data can be optionally set, discrimination by the user is facilitated, such that the user is able to retrieve the picture data for presentation without the necessity of confirming the content of the picture data, that is slide content.

Meanwhile, the editing device 2 and the display unit 4 can be connected by a USB cable, such that picture data, discrimination picture data and the data for relevance can be saved in or read out from the IC card 3, without regard to whether the type of the devices in which the IC card 3 is inserted. The USB cable can be connected to for example the respective USBI/Fs 17, 64 to read out the data from the HDD 11 of the editing device 2 to the display unit 4 as described above.

The aforementioned editing program or the display program may be saved not only in the HDD 11, ROM 12 or FROM 61, but also in a storage medium, such as a magnetic disc, a magneto-optical disc or a semiconductor memory. In this case, the program is read out from the recording medium to the HDD 11, RAM 13 or to the SRAM 62 for execution. For furnishing the recording medium to the user, the program may be installed on for example the HDD 11 by the user. In installing the programs to the HDD 11 through a recording medium, the programs may also be installed from e.g., a downloading site on the HDD 11 over a radio path or over a cable.

INDUSTRIAL APPLICABILITY

According to the present invention, in which data of the first format, discriminated by an identifier, is converted into picture data of a second format, the discrimination picture data for discriminating picture data and the data for relevance for relating the picture data and the discrimination picture data to each other are generated and stored in preset areas of the recording means, the user is able in retrieving and displaying picture data to select the easy-to-discriminate discrimination picture data to retrieve and display picture data extremely readily because the picture data and the discrimination picture data are related to each other by the data for relevance.

Since the discrimination picture data is the filename of the data or desired letters and characters of the first format, the data can be discriminated readily by the user. Since the file name or the letters and characters are converted into the discrimination picture data, the data can be optimally displayed even though the data is not in the language usable with the device.

The invention claimed is:

1. An editing device comprising:
converting means for converting data, for a slide used for presentation, by an identifier, which differs data for a slide of a first format and which converts into picture data for a slide of a second format;

generating means for generating picture data, at a time when said converting means converts the data for a slide to said picture data for a slide, corresponding to the data for a slide, for discriminating which changed picture data had alphabetic data replace the identifier or the identifier which identifies that picture data for a slide changed by the converting means;

another generating means which generates correlation data that associates the picture data and the picture data for a slide; and recording means for recording the picture data for a slide, the picture data for discrimination, and correlation data in recording means.

2. The editing device according to claim 1 wherein the identifier comprises a filename set up corresponding to the aggregate of each above forms of data, and the another generating means changes the filename into picture data and generates the picture data for discrimination.

3. The editing device according to claim 2 wherein the another generating means superposes the picture data of the identifier on background picture data, and generates the picture data for discrimination.

4. The editing device according to claim 1 wherein the converting means converts the data for a slide of the first format to a plurality of picture data for a slide of the second format.

5. The editing device according to claim 1 wherein the second format is defined by Design Rules for Camera File Systems (DCF) format.

6. An editing method comprising:

a step of converting a data, for a slide used for presentation, by an identifier which differs data for a slide a first format and which converts into picture data for a slide of a second format different from the first format;

a step of generating picture data, at a time of converting the data for a slide into the picture data for a slide, corresponding to the data for a slide for discriminating which changed picture data had alphabetic data replace the identifier or the identifier which identifies that picture data for a slide changed during the step of converting;

a step of generating correlation data that associates the picture data and the picture data for a slide; and a step of recording the picture data for a slide, the picture data for discrimination, and correlation data in storage means.

7. The editing method according to claim 6 wherein the identifier is data filename set up corresponding to the aggregate of each above forms of data, and the step of another generating changes the filename into picture data and generates said the picture data for discrimination.

8. The editing method according to claim 7 wherein the picture data of the identifier is superposed on background picture data, and generates the picture data for discrimination.

9. The editing method according to claim 6 wherein the data for a slide of the first format is converted to plurality of picture for a slide of the second format.

10. A recording medium having recorded thereon an editing program that can be executed by a computer, the editing program being operable to implement an editing method comprising:

converting data, for a slide used for presentation, by an identifier, which differs data for a slide a first format and which converts into picture data for a slide of a second format different from the first format;

generating at a time when the converting means converts the data for a slide to picture data for a slide, for discriminating which changed picture data had alphabetic data replace the identifier or the identifier which identifies that picture data for a slide changed by the converting means;

generating correlation data that associates the picture data and the picture data for a slide; and recording the picture data for a slide, the picture data for discrimination, and correlation data recording means.

11. The recording medium according to claim 10 wherein the identifier is data filename set up corresponding to the aggregate of each above form of data, and the step of generating includes converting the letter or character data into picture data for a slide to generate the discrimination picture data for a slide.

12. The recording medium according to claim 11 wherein the generating means superposes the picture data for a slide of the identifier on background picture data for a slide to generate the discrimination picture data for a slide.

13. The recording medium according to claim 10 wherein the converting means converts the data of the first format to a plurality of picture data for a slide of the second format.

14. A display device comprising:

readout means for reading out picture data, for a slide used for presentation, by an identifier, which differs data for a slide of a first format and which converts into picture data for a slide of a second format;

generating means for generating picture data, at a time when said converting means converts the data for a slide to said picture data for a slide, corresponding to the data for a slide, for discriminating which changed picture data had alphabetic data replace the identifier or the identifier which identifies that picture data for a slide changed by the converting means;

another generating means for generates correlation data that associates the picture data and the picture data for a slide;

recording means for recording the picture data for a slide, the picture data for discrimination, and correlation data in storage means; and displaying means for displaying the picture data for a slide, the picture data for discrimination, and correlation data.

15. The display device according to claim 14 wherein the identifier is data filename set up corresponding to the aggregate of each above form of data, and the step of another generating changes the filename into picture data and generates said the picture data for discrimination.

16. The display device according to claim 14 wherein said storage means further comprises an external storage device.

17. The display device according to claim 16 wherein the display means display the picture data for a slide, the picture data for discrimination, and correlation data in storage on detecting that said external storage device has been loaded on a loading unit.

18. The display device according to claim 14 wherein the device further comprises a projector.

19. A display method comprising:

a readout step of reading out picture data for a slide, for a slide used for presentation, by an identifier which differs data for a slide a first format and which converts into picture data for a slide of a second format different from the first format;

a step of generating picture data, at a time of converting the data for a slide into the picture data for a slide, corresponding to the data for a slide for discriminating which changed picture data had alphabetic data replace the identifier or the identifier which identifies that picture data for a slide changed during the step of converting;

a step of another generating correlation data that associates the picture data and the picture data for a slide;

a step of recording the picture data for a slide, the picture data for discrimination, and correlation data in storage means; and a step of displaying the picture data for a slide, the picture data for discrimination, and correlation data in storage means.

20. The display method according to claim 19 wherein the identifier is data filename set up corresponding to the aggregate of each above form of data, and the step of another generating changes the filename into picture data and generates said the picture data for discrimination.

21. The display method according to claim 19 wherein the storage means is an external storage device; the method further comprising:

a step of displaying the picture data for a slide, the picture data for discrimination, and correlation data in storage means on detection of loading of the external storage device on a loading unit.

22. A recording medium having recorded a display program that can be executed by a computer, the display program comprising:

converting data, for a slide used for presentation, by an identifier, which differs data for a slide a first format and which converts into picture data for a slide of a second format different from the first format;

generating at a time when the converting means converts the data for a slide to picture data for a slide, for discriminating which changed picture data had alphabetic data replace the identifier or the identifier which identifies that picture data for a slide changed by the converting means;

generating correlation data that associates the picture data and the picture data for a slide; and recording the picture data for a slide, the picture data for discrimination, and correlation data recording means.

23. The recording medium according to claim 22 wherein the identifier is data filename set up corresponding to the aggregate of each above form of data, and the step of generating includes converting the letter or character data into picture data for a slide to generate the discrimination picture data for a slide.

24. The recording medium according to claim 23 wherein the storage means is an external storage device; the program further comprising:

displaying the picture data for a slide, the picture data for discrimination, and correlation data on detection of loading of the external storage device on a loading unit.

* * * * *

UNITED STATES PATENT AND TRADEMARK OFFICE
CERTIFICATE OF CORRECTION

| | | |
|---|---|---|
| PATENT NO. | : 7,656,400 B2 | Page 1 of 1 |
| APPLICATION NO. | : 10/333702 | |
| DATED | : February 2, 2010 | |
| INVENTOR(S) | : Kiyohiro Oka and Kunihiko Noguchi | |

It is certified that error appears in the above-identified patent and that said Letters Patent is hereby corrected as shown below:

On the Title Page, Item (30), please insert --Foreign Application Priority Data Japan 2001-174723 6/8/2001--

Signed and Sealed this
First Day of March, 2011

David J. Kappos
*Director of the United States Patent and Trademark Office*